(12) United States Patent
Chu et al.

(10) Patent No.: US 10,165,556 B2
(45) Date of Patent: Dec. 25, 2018

(54) DATA TRANSMISSION METHOD AND USER EQUIPMENT

(71) Applicant: Huawei Technologies Co., Ltd., Shenzhen (CN)

(72) Inventors: Xunxun Chu, Bangkok (TH); Zhaodi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 15/068,118

(22) Filed: Mar. 11, 2016

(65) Prior Publication Data

US 2016/0198457 A1 Jul. 7, 2016

Related U.S. Application Data

(63) Continuation of application No. PCT/CN2013/083341, filed on Sep. 11, 2013.

(51) Int. Cl.
| | |
|---|---|
| *H04W 4/00* | (2018.01) |
| *H04W 72/04* | (2009.01) |
| *H04W 72/12* | (2009.01) |
| *H04J 11/00* | (2006.01) |
| *H04L 5/00* | (2006.01) |
| *H04W 28/02* | (2009.01) |
| *H04W 72/14* | (2009.01) |
| *H04W 88/02* | (2009.01) |

(52) U.S. Cl.
CPC ......... *H04W 72/0413* (2013.01); *H04J 11/00* (2013.01); *H04L 5/0055* (2013.01); *H04W 28/0278* (2013.01); *H04W 72/12* (2013.01); *H04W 72/14* (2013.01); *H04W 88/02* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 8,861,474 | B2 * | 10/2014 | Moberg | ............ H04W 72/1284 |
| | | | | 370/329 |
| 9,295,077 | B2 * | 3/2016 | Guo | .................. H04W 72/1268 |

(Continued)

FOREIGN PATENT DOCUMENTS

| | | |
|---|---|---|
| CN | 101778418 A | 7/2010 |
| CN | 102149080 A | 8/2011 |

(Continued)

OTHER PUBLICATIONS

Philips, et al., "Improving the Robustness of Buffer Status Reporting," 3GPP TSG RAN WG2 Meeting #63bis, Tdoc R2-085077, Prague, Czech Republic, Sep. 29-Oct. 3, 2008, 6 pages.

(Continued)

*Primary Examiner* — Phuongchau Ba Nguyen
(74) *Attorney, Agent, or Firm* — Slater Matsil, LLP

(57) ABSTRACT

Embodiments disclose a data transmission method and user equipment. The method includes sending, by user equipment (UE), uplink data to a network side device; and processing, by the UE according to feedback information for the uplink data and received from the network side device, a buffer status report (BSR) corresponding to the uplink data or a scheduling request (SR) corresponding to the uplink data.

13 Claims, 3 Drawing Sheets

(56) References Cited

U.S. PATENT DOCUMENTS

| | | | |
|---|---|---|---|
| 2010/0296472 A1* | 11/2010 | Lee | H04L 1/0026 370/329 |
| 2011/0255492 A1 | 10/2011 | Dai et al. | |
| 2012/0300744 A1 | 11/2012 | Larmo et al. | |
| 2012/0307767 A1 | 12/2012 | Yamada et al. | |
| 2012/0314672 A1 | 12/2012 | Chen | |

FOREIGN PATENT DOCUMENTS

| | | | |
|---|---|---|---|
| CN | 102595603 A | 7/2012 | |
| CN | 102740483 A | 10/2012 | |
| CN | 102833857 A | 12/2012 | |
| EP | 2677804 A1 | 12/2013 | |
| WO | WO 2009/116939 A2 * | 9/2009 | H04W 72/1284 |
| WO | 2013113390 A1 | 8/2013 | |

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 11)," 3GPP TS 36.321, V11.3.0, Jun. 2013, 57 pages.
Sunplus mMobile Inc.: "Consideration on BSR Triggers," TSG-RAN WG2 Meeting #60bis, R2-080400, Jan. 14-18, 2008, 5 pages, Sevilla, Spain.

* cited by examiner

DATA TRANSMISSION METHOD AND USER EQUIPMENT

This application is a continuation of International Application No. PCT/CN2013/083341, filed on Sep. 11, 2013, which is hereby incorporated by reference in its entirety.

TECHNICAL FIELD

The present invention relates to the field of communications technologies, and in particular, to a data transmission method and user equipment.

BACKGROUND

With rapid development of communications technologies, Long Term Evolution (LTE), which is one of mainstream technologies of a mobile telecommunication system, is widely researched and applied around the world. It is stipulated in an established protocol that, a buffer status report (BSR) is triggered when user equipment (UE) has uplink data available for transmission. If a regular BSR is already triggered and is not canceled and no uplink resource is allocated during a current transmission time interval (TTI), the UE triggers a scheduling request (SR), and then reports the SR at a next SR reporting time. Accordingly, a base station performs uplink scheduling, acquires the BSR, and then schedules, according to the BSR, the to-be-transmitted uplink data.

Specifically, after the UE triggers the regular BSR, the uplink data is sent when the UE receives a uplink grant (UL Grant) delivered by the base station.

In the prior art, if the uplink data contains a BSR MAC control element (MCE), or the uplink data contains all to-be-transmitted data, a current BSR is canceled.

However, in a process of implementing technical solutions in embodiments of the present invention, it is found that in an existing BSR mechanism, no matter whether uplink data is transmitted successfully, a current BSR is canceled provided that the uplink data contains a BSR MCE or all to-be-transmitted data. When a current uplink data transmission fails, for example, the transmission failure is caused by a false alarm or by an insufficient demodulation capability of a base station, the base station no longer performs uplink scheduling for the UE, and the UE no longer sends an uplink SR. The UE can trigger a regular BSR again only when a BSR retransmission timer times out, so as to trigger an SR and obtain a next scheduling opportunity. However, in the protocol, a prescribed duration of the BSR retransmission timer is 320 ms-1024 ms. Once the foregoing transmission failure occurs, an uplink delay of at least 320 ms is introduced, thereby causing a relatively long data transmission delay.

SUMMARY

Embodiments provide a data transmission method and a user equipment, which are used to solve a problem of a relatively long data transmission delay caused by a BSR mechanism in the prior art.

According to a first aspect, a data transmission method is provided and includes: sending, by a user equipment (UE), uplink data to a network side device; and processing, by the UE according to feedback information for the uplink data and received from the network side device, a buffer status report (BSR) corresponding to the uplink data or a scheduling request (SR) corresponding to the uplink data.

With reference to the first aspect, in a first possible implementation, after the sending, by UE, uplink data to a network side device, the method further includes: retaining the BSR. The processing, by the UE according to feedback information for the uplink data and received from the network side device, a BSR corresponding to the uplink data includes: when the feedback information indicates that the network side device correctly receives the uplink data, canceling, by the UE, the retained BSR; and when the feedback information indicates that the network side device does not correctly receive the uplink data, continuing, by the UE, retaining the BSR, and triggering SR reporting.

With reference to the first aspect or the first possible implementation of the first aspect, in a second possible implementation, before the sending, by UE, uplink data to a network side device, the method includes: triggering SR reporting according to the BSR; and receiving an uplink grant corresponding to the SR. The sending, by UE, uplink data to a network side device includes: sending the uplink data to the network side device according to the uplink grant.

With reference to the second possible implementation of the first aspect, in a third possible implementation, after the receiving an uplink grant corresponding to the SR, the method further includes: retaining the SR; and the processing, by the UE according to feedback information for the uplink data and received from the network side device, an SR corresponding to the uplink data includes: when the feedback information indicates that the network side device correctly receives the uplink data, canceling, by the UE, the retained SR; and when the feedback information indicates that the network side device does not correctly receive the uplink data, continuing, by the UE, retaining the SR, and reporting the SR.

With reference to the first aspect or any one of the first possible implementation to the third possible implementation of the first aspect, in a fourth possible implementation, the uplink data includes: a BSR control information element; all to-be-transmitted data in a buffer; or a part of to-be-transmitted data in a buffer, and the BSR.

According to a second aspect, a user equipment is provided and includes: a sending unit, configured to send uplink data to a network side device; and a processing unit, configured to process, according to feedback information for the uplink data and received from the network side device, a buffer status report (BSR) corresponding to the uplink data or a scheduling request (SR) corresponding to the uplink data.

With reference to the second aspect, in a first possible implementation, the processing unit is further specifically configured to retain the BSR; and configured to: when the feedback information indicates that the network side device correctly receives the uplink data, cancel the retained BSR; and when the feedback information indicates that the network side device does not correctly receive the uplink data, continue retaining the BSR, and trigger SR reporting.

With reference to the second aspect or the first possible implementation of the second aspect, in a second possible implementation, the user equipment further includes a receiving unit; the processing unit is further configured to trigger SR reporting according to the BSR; the receiving unit is configured to receive an uplink grant corresponding to the SR; and the sending unit is specifically configured to send the uplink data to the network side device according to the uplink grant.

With reference to the second possible implementation of the second aspect, in a third possible implementation, the processing unit is further configured to retain the SR; and configured to: when the feedback information indicates that the network side device correctly receives the uplink data, cancel the retained SR; and when the feedback information indicates that the network side device does not correctly receive the uplink data, continue retaining the SR; and the sending unit is further configured to report the SR.

With reference to the second aspect or any one of the first possible implementation to the third possible implementation of the second aspect, in a fourth possible implementation, the uplink data includes: a BSR control information element; all to-be-transmitted data in a buffer; or a part of to-be-transmitted data in a buffer, and the BSR.

According to a third aspect, a user equipment is further provided. The user equipment includes a transmitter, configured to send uplink data to a network side device; and a processor, configured to process, according to feedback information for the uplink data and received from the network side device, a buffer status report (BSR) corresponding to the uplink data or a scheduling request (SR) corresponding to the uplink data.

With reference to the third aspect, in a first possible implementation, the processor is further specifically configured to retain the BSR; and configured to: when the feedback information indicates that the network side device correctly receives the uplink data, cancel the retained BSR; and when the feedback information indicates that the network side device does not correctly receive the uplink data, continue retaining the BSR, and trigger SR reporting.

With reference to the third aspect or the first possible implementation of the third aspect, in a second possible implementation, the user equipment further includes a receiver; the processor is further configured to trigger SR reporting according to the BSR; the receiver is configured to receive an uplink grant corresponding to the SR; and the transmitter is specifically configured to send the uplink data to the network side device according to the uplink grant.

With reference to the second possible implementation of the third aspect, in a third possible implementation, the processor is further configured to retain the SR; and configured to: when the feedback information indicates that the network side device correctly receives the uplink data, cancel the retained SR; and when the feedback information indicates that the network side device does not correctly receive the uplink data, continue retaining the SR; and the transmitter is further configured to report the SR.

With reference to the third aspect or any one of the first possible implementation to the third possible implementation of the third aspect, in a fourth possible implementation manner, the uplink data includes: a BSR control information element; all to-be-transmitted data in a buffer; or a part of to-be-transmitted data in a buffer, and the BSR.

In the embodiments, after sending uplink data to a network side device, a user equipment (UE) processes, according to feedback information for the uplink data and received from the network side device, a buffer status report (BSR) corresponding to the uplink data or a scheduling request (SR) corresponding to the uplink data. Specifically, the BSR or the SR is retained until the feedback information for the uplink data is received from the network side device, and then the BSR or the SR is processed according to the feedback information, instead of being immediately canceled after the uplink data is sent. Therefore, in this case, if the uplink data is not transmitted successfully, because the BSR or the SR still exists, the UE may continue to request the network side device, for example, a base station, to allocate an uplink resource, so as to transmit the uplink data that is not transmitted successfully. In this way, no uplink data transmission delay is due to a wait for timeout of a BSR retransmission timer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
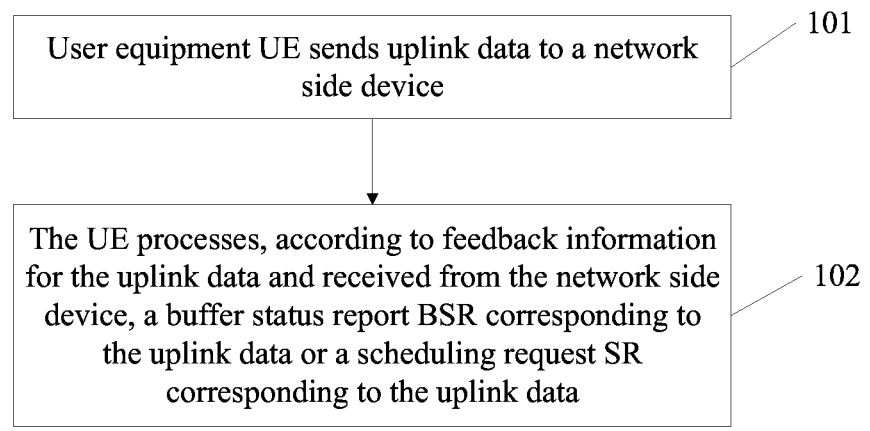
FIG. 1 is a flowchart of a data transmission method according to an embodiment.

Embodiments provide a data transmission method and user equipment. After sending uplink data to a network side device, user equipment (UE) processes, according to feedback information for the uplink data and received from the network side device, a buffer status report (BSR) corresponding to the uplink data or a scheduling request (SR) corresponding to the uplink data. In the other words, the BSR or the SR is retained until the feedback information for the uplink data is received from the network side device, and then the BSR or the SR is processed according to the feedback information, instead of being immediately canceled after the uplink data is sent. Therefore, in this case, if the uplink data is not transmitted successfully, because the BSR or the SR still exists, the UE may continue to request the network side device, for example, a base station, to allocate an uplink resource, so as to transmit the uplink data that is not transmitted successfully. In this way, no uplink data transmission delay is due to a wait for timeout of a BSR retransmission timer.

To make the objectives, technical solutions, and advantages of the embodiments clearer, the following clearly describes the technical solutions in the embodiments with reference to the accompanying drawings in the embodiments. Apparently, the described embodiments are a part rather than all of the embodiments. All other embodiments obtained by persons of ordinary skill in the art based on the embodiments without creative efforts shall fall within the protection scope.

Various aspects are described in this specification with reference to a user equipment and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, an session initiation protocol (SIP) phone, a wireless local loop (WLL) station, or a personal digital assistant (PDA). The wireless terminal may also be called a system, a subscriber unit, a subscriber station, a mobile station, a remote station, an access point, a remote terminal, an access terminal, a user terminal, a user agent, a user device (UD), or user equipment (UE).

The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (Base Transceiver Station, BTS) in GSM or CDMA, may also be a base station (NodeB) in WCDMA, and may further be an evolved NodeB (NodeB, eNB, or e-NodeB) in the LTE, which is not limited in the present application.

The base station controller may be a base station controller (base station controller, BSC) in GSM or CDMA, or a radio network controller (RNC) in WCDMA, which is not limited in the present application.

In addition, the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

The following describes exemplary implementation manners in detail with reference to the accompanying drawings.

Embodiment 1

This embodiment provides a data transmission method. Referring to FIG. 1, the method includes the following steps.

Step 101: User equipment (UE) sends uplink data to a network side device.

Step 102: The UE processes, according to feedback information for the uplink data and received from the network side device, a buffer status report (BSR) corresponding to the uplink data or a scheduling request (SR) corresponding to the uplink data.

In this embodiment, the network side device is specifically, for example, a base station, a base station controller, or a relay node (RN).

The uplink data may specifically include a BSR MCE (MAC control information element); or include all to-be-transmitted data in a buffer; or include a part of to-be-transmitted data in a buffer, and the BSR.

Accordingly, in step 101, the sending, by the UE, the uplink data to the network side device specifically includes three cases: in a first case, uplink data that includes a BSR MCE is sent; in a second case, uplink data that includes all to-be-transmitted data is sent; and in a third case, uplink data that includes a part of to-be-transmitted data and the BSR is sent.

After the UE performs step 101, that is, after the UE sends the uplink data, the network side device (a base station is used as an example in the following description) receives the uplink data accordingly. In a practical application, the base station sometimes does not correctly receive the uplink data, for example, the receiving failure is caused by a false alarm or an insufficient demodulation capability of the base station. According to protocol specifications, no matter whether the base station correctly receives the uplink data, feedback information is sent to the UE.

In this case, the UE receives feedback information for the uplink data and sent by the base station. After the feedback information is received, the UE performs step 102, that is, the UE processes, according to the feedback information, the buffer status report (BSR) corresponding to the uplink data or the scheduling request (SR) corresponding to the uplink data.

The following introduces BSR processing and SR processing separately.

Turning now to BSR processing. In an embodiment, after the UE performs step 101, the method further includes: retaining the BSR; and then step 102 specifically includes: when the feedback information indicates that the network side device correctly receives the uplink data, canceling, by the UE, the retained BSR; and when the feedback information indicates that the network side device does not correctly receive the uplink data, continuing, by the UE, retaining the BSR, and triggering SR reporting.

Specifically, for example, after the UE sends the uplink data, the BSR is retained, instead of being immediately canceled in the prior art; and then, when the feedback information, which is sent by the base station and indicates that the base station correctly receives the uplink data, is received, it indicates that the uplink data has been transmitted successfully; as a result, it is unnecessary to notify the base station again to allocate an uplink resource, and the retained BSR is canceled. In this case, the feedback information is, for example, acknowledgment (Acknowledgment, ACK) information. However, when the feedback information, which is sent by the base station and indicates that the base station does not correctly receive the uplink data, is received, it indicates that the uplink data is not transmitted successfully; as a result, it is necessary to notify the base station again to allocate an uplink resource, and the BSR continues being retained and SR reporting is triggered. Then, after receiving an SR, the base station continues to allocate an uplink resource to the UE, and the UE may continue to retransmit the uplink data, so that no uplink data transmission delay is due to a wait for timeout of a BSR retransmission timer. In this case, the feedback information is, for example, negative acknowledgment (NACK) information.

Further, before the UE performs step 101, if the base station does not allocate an uplink resource to the UE during a current transmission time interval (TTI), for example, the UE does not receive a UL Grant sent by the base station, the method further includes: triggering SR reporting according to the BSR, so as to notify the base station to allocate an uplink resource to the UE; then accordingly, the UE performs a step of receiving a UL Grant corresponding to the SR; and then step 101 is specifically: based on the UL Grant, sending uplink data to a network side device, for example, a base station.

Attention is then directed towards performing SR processing according to the feedback information.

In the foregoing description of BSR processing, it is described that before the UE performs step 101, if the base station does not allocate an uplink resource to the UE during the current transmission time interval (TTI), the UE triggers, based on the BSR, SR reporting. Therefore, in this embodiment, after the UE receives the UL Grant corresponding to the SR, the method further includes: retaining the SR; and then step 102 specifically includes: when the feedback information indicates that the network side device correctly receives the uplink data, canceling, by the UE, the retained SR; and when the feedback information indicates that the network side device does not correctly receive the uplink data, continuing, by the UE, retaining the SR, and reporting the SR.

Specifically, for example, after the UE receives the UL Grant, the SR is retained, instead of being immediately canceled in the prior art; and then, when the feedback information, which is sent by the base station and indicates that the base station correctly receives the uplink data, is received, it indicates that the uplink data has been transmitted successfully; as a result, it is unnecessary to notify the base station again to allocate an uplink resource, and the retained SR is canceled. In this case, the feedback information is, for example, acknowledgment (ACK) information. However, when the feedback information, which is sent by the base station and indicates that the base station does not correctly receive the uplink data, is received, it indicates that the uplink data is not transmitted successfully; as a result, it is necessary to notify the base station again to allocate an uplink resource, and the SR continues being retained and the SR is reported. Then, after receiving the SR, the base station continues to allocate an uplink resource to the UE, and the UE may continue to retransmit the uplink data, so that transmission of the uplink data is not delayed, because it is unnecessary to wait for the BSR retransmission timer to time out. In this case, the feedback information is, for example, negative acknowledgment (NACK) information.

To make it easier for persons skilled in the art to understand the present invention more clearly, the following describes the data transmission method in this embodiment more clearly and completely.

Figure 2:
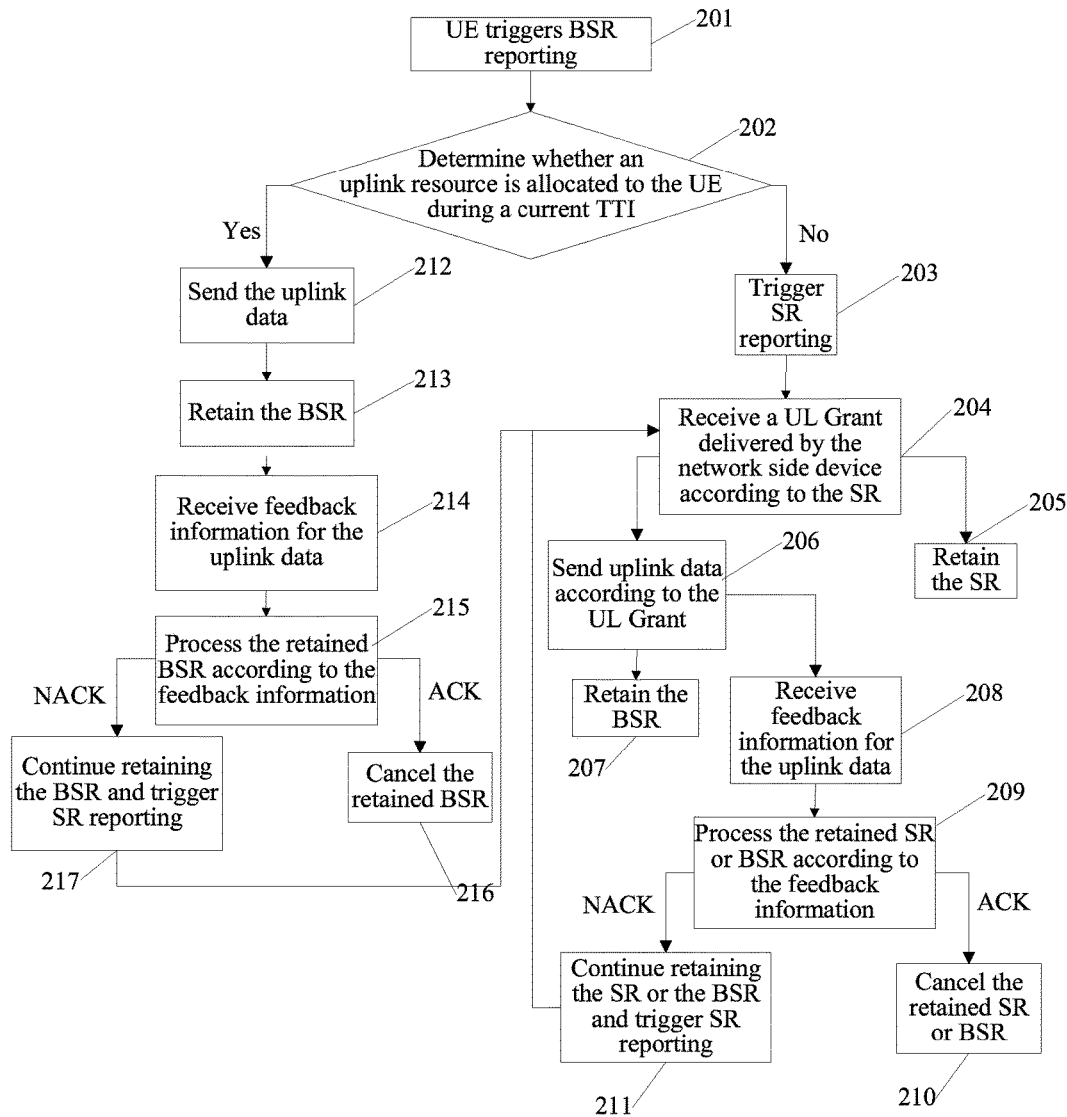
FIG. 2 is a schematic flowchart of a data transmission method according to an embodiment.

Referring to FIG. 2, the method includes the following steps.

Step 201: UE triggers BSR reporting; specifically, BSR reporting is triggered, for example, when the UE has data available in an uplink buffer; and when the BSR is triggered, step 202 is performed.

Step 202: Determine whether an uplink resource is allocated to the UE during a current TTI; and based on a result of the determining, step 203 or step 212 is performed.

Step 203: Trigger SR reporting when no uplink resource is allocated to the UE during the current TTI; after receiving an SR, a network side device, for example, a base station, delivers a UL Grant; and then accordingly, the UE performs step 204.

Step 204: Receive the UL Grant which is delivered, according to the SR, by the network side device; when receiving the UL Grant, the UE may perform step 205 and step 206 at the same time, or may perform step 205 prior to step 206, or may perform step 206 prior to step 205. In another embodiment, when the UE receives the UL Grant, the UE performs step 206 and step 207; similarly, step 206 and step 207 may be performed at the same time, or may be performed sequentially, which is not limited in the present application. Therefore, in this case, the UE may choose to retain the SR, or choose to retain the BSR, and both the choices may achieve a purpose of notifying the base station again to allocate an uplink resource to the UE.

Step 205: Retain the SR.

Step 206: Send uplink data according to the UL Grant.

Step 207: Retain the BSR. No matter whether the SR or the BSR is retained, when the network side device receives the uplink data or does not receive the uplink data within a predetermined time, feedback information is delivered to the UE, so as to inform the UE; and then accordingly, the UE performs step 208.

Step 208: Receive the feedback information for the uplink data; and then the UE performs step 209.

Step 209: Process the retained SR or BSR according to the feedback information; for specific processing, refer to step 210 and step 211.

Step 210: When the feedback information is ACK, cancel the retained SR or BSR, because in this case, it indicates that the uplink data of the UE has been transmitted successfully. Therefore, the SR or the BSR does not need to be retained any longer.

Step 211: When the feedback information is NACK, continue retaining the SR or the BSR and trigger SR reporting. In this case, it indicates that the uplink data fails to be transmitted; therefore, the SR continues being retained and SR reporting is triggered; or the BSR continues being retained, and then SR reporting is triggered based on the BSR, so as to notify the base station to continue to allocate an uplink resource to the UE. Therefore, the UE may trigger an SR and continue to transmit the uplink data without waiting for a BSR retransmission timer to time out, thereby reducing a transmission delay of the uplink data.

In a further embodiment, after step 211, step 204 may be repeated, and steps subsequent to step 204 are performed successively.

Step 212: Send the uplink data when an uplink resource is allocated to the UE during the current TTI; because no SR is triggered in this case, the UE can only choose to retain the BSR, that is, step 213 is performed.

Step 213: Retain the BSR.

Step 214: Receive the feedback information for the uplink data, which is similar to step 208.

Step 215: Process the retained BSR according to the feedback information; for specific processing, reference may be made to step 216 and step 217. In step 216, because the feedback information indicates that the base station has correctly received the uplink data, the BSR does not need to be retained; in step 217, in this case, it indicates that the uplink data fails to be transmitted; therefore, the BSR continues being retained, and then SR reporting is triggered based on the BSR, so as to notify the base station to continue to allocate an uplink resource to the UE. Therefore, the UE may trigger an SR and continue to transmit the uplink data without waiting for the BSR retransmission timer to time out, thereby reducing the transmission delay of the uplink data.

In a further embodiment, after step 217, step 204 may be repeated, and steps subsequent to step 204 may be performed successively.

It can be seen from the foregoing description that, after sending uplink data to a network side device, user equipment (UE) processes, according to feedback information for the uplink data and received from the network side device, a buffer status report (BSR) corresponding to the uplink data or a scheduling request (SR) corresponding to the uplink data. Specifically, the BSR or the SR is retained until the feedback information for the uplink data is received from the network side device, and then the BSR or the SR is processed according to the feedback information, instead of being immediately canceled after the uplink data is sent. Therefore, in this case, if the uplink data is not transmitted successfully, because the BSR or the SR still exists, the UE may continue to request the network side device, for example, a base station, to allocate an uplink resource, so as to transmit the uplink data that is not transmitted successfully. In this way, no uplink data transmission delay is due to a wait for timeout of a BSR retransmission timer.

Embodiment 2

Figure 3:
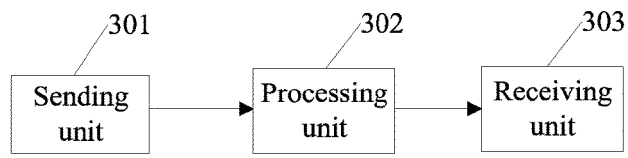
FIG. 3 is a functional block diagram of a user equipment according to an embodiment.

Based on a same design idea, this embodiment further provides user equipment. As shown in FIG. 3, the user equipment includes: a sending unit 301, configured to send uplink data to a network side device; and a processing unit 302, configured to process, according to feedback information for the uplink data and received from the network side device, a buffer status report (BSR) corresponding to the uplink data or a scheduling request (SR) corresponding to the uplink data.

In a further embodiment, the processing unit 302 is further specifically configured to retain the BSR; and configured to cancel the retained BSR when the feedback information indicates that the network side device correctly receives the uplink data; and when the feedback information indicates that the network side device does not correctly receive the uplink data, continue retaining the BSR, and trigger SR reporting.

Further, the user equipment further includes a receiving unit 303; the processing unit 302 is further configured to trigger SR reporting according to the BSR; the receiving unit 303 is configured to receive an uplink grant corresponding to the SR; and the sending unit 301 is specifically configured to send the uplink data to the network side device according to the uplink grant.

Further, the processing unit 302 is further configured to retain the SR; and configured to cancel the retained SR when the feedback information indicates that the network side device correctly receives the uplink data, and when the feedback information indicates that the network side device does not correctly receive the uplink data, continue retaining the SR; and the sending unit 301 is further configured to report an SR.

In each of the foregoing embodiments, the uplink data includes: a BSR control information element; all to-be-transmitted data in a buffer; or a part of the to-be-transmitted data in a buffer, and the BSR.

Various variations and specific instances of the data transmission method in the foregoing embodiments shown in FIG. 1 and FIG. 2 are also applicable to the user equipment in this embodiment. Persons skilled in the art may clearly know an implementation of the user equipment in this embodiment from the foregoing detailed description of the data transmission method. Therefore, for brevity of this specification, details are not described herein again.

Embodiment 3

Figure 4:
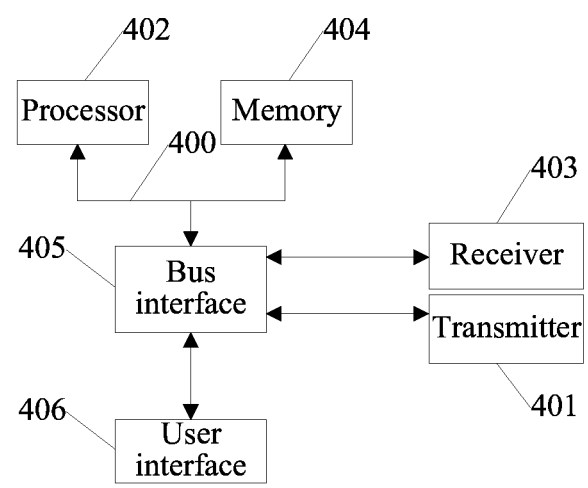
FIG. 4 is an exemplary conceptual diagram illustrating hardware implementation of a user equipment according to an embodiment.

Based on a same design idea, this embodiment further provides user equipment. As shown in FIG. 4, the user equipment includes: a transmitter 401, configured to send uplink data to a network side device; and a processor 402, configured to process, according to feedback information for the uplink data and received from the network side device, a buffer status report (BSR) corresponding to the uplink data or a scheduling request (SR) corresponding to the uplink data.

In FIG. 4, there is a bus architecture (represented by a bus 400). The bus 400 may include any number of interconnected buses and bridges. The bus 400 connects together various circuits, including one or more processors represented by the processor 402 and a memory represented by a memory 404. The bus 400 may further connect together various other circuits such as a peripheral device, a voltage stabilizer, and a power management circuit, which is publicly known in the art and therefore not further described again in this specification. A bus interface 405 provides an interface between the bus 400 and a receiver 403 and an interface between the bus 400 and a transmitter 401. The receiver 403 and the transmitter 401 may be a same component, that is, the two combined may be called a transceiver which provides a unit that is configured to communicate with various other apparatuses on a transmission medium. Depending on a nature of the user equipment, a user interface 406, for example, a small keyboard, a display, a loudspeaker, a microphone, or a joystick may be further provided.

The processor 402 is responsible for managing the bus 400 and common processing, and the memory 404 may be configured to store data used by the processor 402 during operation execution.

In a further embodiment, the processor 402 is further specifically configured to retain the BSR; and configured to cancel the retained BSR when the feedback information indicates that the network side device correctly receives the uplink data, and when the feedback information indicates that the network side device does not correctly receive the uplink data, continue retaining the BSR, and trigger SR reporting.

Further, the user equipment further includes the receiver 403; the processor 402 is further configured to trigger SR reporting according to the BSR; the receiver 403 is configured to receive an uplink grant corresponding to the SR; and the transmitter 401 is specifically configured to send the uplink data to the network side device according to the uplink grant.

Further, the processor 402 is further configured to retain the SR; and configured to cancel the retained SR when the feedback information indicates that the network side device correctly receives the uplink data, and when the feedback information indicates that the network side device does not correctly receive the uplink data, continue retaining the SR; and the transmitter 401 is further configured to report the SR.

Various variations and specific instances of the data transmission method in the foregoing embodiments shown in FIG. 1 and FIG. 2 are also applicable to the user equipment in this embodiment. Persons skilled in the art may clearly know an implementation of the user equipment in this embodiment from the foregoing detailed description of the data transmission method. Therefore, for brevity of this specification, details are not described herein again.

Persons skilled in the art should understand that the embodiments may be provided as a method, a system, or a computer program product. Therefore, the present invention may be implemented by hardware embodiments, software embodiments, or a combination thereof. Furthermore, the present invention may take forms of a computer program product implemented on one or more computer storage mediums (which includes but is not limited to a magnetic disk storage, a CD-ROM, and an optical storage) that includes computer program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although exemplary embodiments of the present invention have been described, persons skilled in the art may still make various changes and modifications to these embodiments, once they learn the basic innovative concept. Therefore, the following claims are intended to be construed as to cover the exemplary embodiments and all changes and modifications falling within the scope of the present invention.

Apparently, persons skilled in the art may make various modifications and variations to the present invention without departing from the spirit and scope of the present invention. The present invention is intended to cover these modifications and variations, provided that they fall within the scope of protection defined by the following claims and their equivalent technologies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data transmission method, comprising:
   sending, by user equipment (UE), uplink data to a network side device;
   after sending the uplink data to the network side device, receiving feedback information for the uplink data from the network side device, wherein the feedback information indicates whether the network side device correctly received the uplink data; and
   processing, by the UE according to the feedback information, a buffer status report (BSR) corresponding to the uplink data, wherein processing the BSR comprises:
      retaining the BSR;
      in response to the feedback information indicating that the network side device correctly received the uplink data, canceling, by the UE, the retained BSR; and
      in response to the feedback information indicating that the network side device did not correctly receive the uplink data, continuing, by the UE, to retain the BSR, and triggering scheduling request (SR) reporting.

2. The method according to claim 1, wherein:
   before sending the uplink data to the network side device, the method further comprises:
      triggering SR reporting according to the BSR; and
      receiving an uplink grant corresponding to the SR; and
   sending, by the UE, the uplink data to a network side device comprises:
      sending the uplink data to the network side device according to the uplink grant.

3. The method according to claim 1, wherein the uplink data comprises:
   a BSR control information element.

4. The method according to claim 1, wherein the uplink data comprises:
   all to-be-transmitted data in a buffer.

5. The method according to claim 1, wherein the uplink data comprises:
   a part of to-be-transmitted data in a buffer, and the BSR.

6. A user equipment, comprising:
   a sending unit, configured to send uplink data to a network side device;
   a receiving unit, configured to, after sending the uplink data to the network side device, receive feedback information for the uplink data from the network side device, wherein the feedback information indicates whether the network side device correctly received the uplink data; and
   a processing unit, configured to:
      process, according to the feedback information for the uplink data that is received from the network side device, a buffer status report (BSR) corresponding to the uplink data, wherein processing the BSR comprises:
      retaining the BSR;
      in response to the feedback information indicating that the network side device correctly received the uplink data, canceling the retained BSR; and
      in response to the feedback information indicating that the network side device did not correctly receive the uplink data, continuing to retain the BSR, and triggering scheduling request (SR) reporting.

7. The user equipment according to claim 6, wherein:
   the processing unit is further configured to trigger SR reporting-according to the BSR;
   the receiving unit is configured to receive an uplink grant corresponding to the SR; and
   the sending unit is further configured to send the uplink data to the network side device according to the uplink grant.

8. The user equipment according to claim 6, wherein the uplink data comprises:
   a BSR control information element;
   all to-be-transmitted data in a buffer; or
   a part of to-be-transmitted data in a buffer, and the BSR.

9. A user equipment, comprising:
   a transmitter, configured to send uplink data to a network side device;
   a receiver, configured to, after sending the uplink data to the network side device, receiving feedback information for the uplink data from the network side device, wherein the feedback information indicates whether the network side device correctly received the uplink data; and a processor, configured to process, according to the feedback information for the uplink data that is received from the network side device, a buffer status report (BSR) corresponding to the uplink data, wherein processing the BSR comprises:

retaining the BSR;

in response to the feedback information indicating that the network side device correctly received the uplink data, canceling the retained BSR; and in response to the feedback information indicating that the network side device did not correctly receive the uplink data, continuing to retain the BSR, and triggering scheduling request (SR) reporting.

10. The user equipment according to claim 9, wherein the user equipment further comprises a receiver;

wherein the processor is further configured to, before the transmitter sends the uplink data to the network side device, trigger initial SR reporting according to the BSR;

wherein the receiver is configured to receive an uplink grant corresponding to the SR; and the transmitter is further configured to send the uplink data to the network side device according to the uplink grant.

11. The user equipment according to claim 9, wherein the uplink data comprises:

a BSR control information element.

12. The user equipment according to claim 9, wherein the uplink data comprises:

all to-be-transmitted data in a buffer.

13. The user equipment according to claim 9, wherein the uplink data comprises:

a part of to-be-transmitted data in a buffer, and the BSR.

* * * * *